(12) United States Patent
Ramabhadran et al.

(10) Patent No.: US 9,331,477 B2
(45) Date of Patent: May 3, 2016

(54) POWER CIRCUITRY FOR A SYNTHETIC JET OF A COOLING SYSTEM

(71) Applicant: General Electric Company, Schenectady, NY (US)

(72) Inventors: Ramanujam Ramabhadran, Niskayuna, NY (US); Charles Erklin Seeley, Niskayuna, NY (US); John Stanley Glaser, Niskayuna, NY (US); Robert James Thomas, Clifton Park, NY (US); Stanton Earl Weaver, Jr., Broadalbin, NY (US)

(73) Assignee: General Electric Company, Niskayuna, NY (US)

( * ) Notice: Subject to any disclaimer, the term of this patent is extended or adjusted under 35 U.S.C. 154(b) by 83 days.

(21) Appl. No.: 14/060,168

(22) Filed: Oct. 22, 2013

(65) Prior Publication Data

US 2015/0108899 A1    Apr. 23, 2015

(51) Int. Cl.
| | |
|---|---|
| *F21V 29/02* | (2006.01) |
| *H01L 23/467* | (2006.01) |
| *H02H 9/04* | (2006.01) |
| *F21Y 101/02* | (2006.01) |
| *F21V 29/63* | (2015.01) |

(52) U.S. Cl.
CPC .............. *H02H 9/04* (2013.01); *H02H 9/041* (2013.01); *F21V 29/63* (2015.01); *F21Y 2101/02* (2013.01)

(58) Field of Classification Search
None
See application file for complete search history.

(56) References Cited

U.S. PATENT DOCUMENTS

| | | | |
|---|---|---|---|
| 5,949,197 A * | 9/1999 | Kastner .............. | H05B 41/2851 315/291 |
| 6,588,497 B1 | 7/2003 | Glezer et al. | |
| 7,251,139 B2 | 7/2007 | Bhattacharya et al. | |
| 2007/0147046 A1* | 6/2007 | Arik ........................ | F21V 29/02 362/294 |
| 2008/0043061 A1 | 2/2008 | Glezer et al. | |
| 2009/0141065 A1 | 6/2009 | Darbin et al. | |
| 2009/0167109 A1* | 7/2009 | Tomita .................. | F04B 43/046 310/317 |
| 2010/0079943 A1 | 4/2010 | Arik et al. | |
| 2011/0141691 A1 | 6/2011 | Slaton et al. | |
| 2011/0204790 A1* | 8/2011 | Arik ........................ | F21V 29/02 315/113 |
| 2011/0241643 A1* | 10/2011 | Iino .............................. | 323/293 |
| 2011/0316416 A1 | 12/2011 | Han et al. | |

FOREIGN PATENT DOCUMENTS

| | | | |
|---|---|---|---|
| EP | 1156961 B1 | 12/2003 | |
| EP | 1989051 B1 | 1/2012 | |

* cited by examiner

*Primary Examiner* — Douglas W Owens
*Assistant Examiner* — Dedei K Hammond
(74) *Attorney, Agent, or Firm* — Pabrita K. Chakrabarti

(57) ABSTRACT

A cooling system includes a synthetic jet having a first synthetic jet lead and a second synthetic jet lead. The cooling system also includes a capacitor having a first capacitor lead and a second capacitor lead. The first capacitor lead is coupled to the first synthetic jet lead. The synthetic jet is configured to be powered via an alternating current (AC) power source coupled to the second capacitor lead and to the second synthetic jet lead.

20 Claims, 4 Drawing Sheets

POWER CIRCUITRY FOR A SYNTHETIC JET OF A COOLING SYSTEM

BACKGROUND

The present invention relates generally to cooling systems, and more particularly to power circuitry for a synthetic jet of a cooling system.

Electronic devices such as computing systems and lighting systems typically include heat generating elements like integrated circuits (ICs), semiconductor components, electrical connections, and light emitting diodes (LEDs) that lead to device heating. Light emitting diodes tend to heat up and dissipate heat to their surroundings as a result of the power provided to them by power circuitry. The heat generated in LEDs as well as ICs can lead to significant reduction in the operational efficiency and/or overheating. Accordingly, many electronic devices are fitted with cooling systems to reduce heat produced by the electronic devices.

Certain cooling systems include synthetic jets. Synthetic jets typically include two plates that form a fluid housing. When the plates are moved back and forth from their original position, ambient air enters the fluid housing and also leaves the fluid housing. At least one of the two plates has apertures to allow for fluids to enter and exit the fluid housing. Piezoelectric transducers may be used to generate motion of the plates in synthetic jets owing to their property of converting electric signals to mechanical vibrations. In certain synthetic jets, at least one plate includes a piezoelectric transducer that is connected to a power source. When an electric signal is provided to the piezoelectric transducer, the plate with the transducer moves away from the rest of the jet assembly thereby increasing the volume of the fluid housing. The increase in volume leads to suction of air into the fluid housing through the apertures on the plate. When the electric signal is disconnected or when a rapidly changing alternating electric signal is applied, the piezoelectric transducer returns to its normal position, thus leading to a reduction in volume of the fluid housing. The reduction in volume leads to a release of air from the apertures, which cools the components of the electronic device that are proximate to the synthetic jets. As may be appreciated, the circuitry used to power the synthetic jets may include many components, may consume a considerable amount of power, and/or may be expensive. Furthermore, in certain applications, the circuitry used to power the synthetic jets may take up a considerable amount of valuable space and/or volume, thereby blocking the use of the circuitry in certain applications. Moreover, such circuitry may increase a cost of using the synthetic jets, thereby deterring use of the synthetic jets.

BRIEF DESCRIPTION

In one embodiment, a cooling system includes a synthetic jet having a first synthetic jet lead and a second synthetic jet lead. The cooling system also includes a capacitor having a first capacitor lead and a second capacitor lead. The first capacitor lead is coupled to the first synthetic jet lead. The synthetic jet is configured to be powered via an alternating current (AC) power source coupled to the second capacitor lead and to the second synthetic jet lead.

In another embodiment, a lighting system includes a light assembly and a cooling system disposed adjacent to the light assembly. The cooling system is configured to direct air toward the light assembly to cool the light assembly. The cooling system includes a synthetic jet having a first synthetic jet lead and a second synthetic jet lead. The cooling system also includes a capacitor having a first capacitor lead and a second capacitor lead. The first capacitor lead is directly coupled to the first synthetic jet lead. The synthetic jet is configured to be powered via an alternating current (AC) power source coupled directly to the second capacitor lead and to the second synthetic jet lead.

In another embodiment, a cooling system includes a piezoelectric synthetic jet and synthetic jet power circuitry. The synthetic jet power circuitry is configured to condition power from an alternating current (AC) power source, and to provide the conditioned power to the piezoelectric synthetic jet. The synthetic jet power circuitry consists essentially of a capacitor. Additional protective elements such as a fuse, a transient voltage suppressor, and/or a metal oxide varistor may be added as desired without compromising the functionality of the synthetic jet power circuitry. Furthermore, additional elements may be added to selectively tune harmonics in the synthetic jet power circuitry.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present disclosure generally relate to cooling systems, such as a cooling system used in a lighting system. For example, a cooling system may include a synthetic jet configured to be powered from an alternating current (AC) power source. In certain embodiments, the synthetic jet may be coupled directly to the AC power source. In other embodiments, a capacitor may be serially coupled to the synthetic jet, and the AC power source may be coupled directly to the capacitor and synthetic jet that are arranged serially. Accordingly, the synthetic jet may be powered using few components that consume small amounts of power, and may be produced with low cost. As may be appreciated, while certain embodiments describe the cooling system as part of a lighting system, other embodiments may use the cooling system as part of any suitable electronic device or assembly, such as an AC adapter, a power supply, a portable electronics device, a computing device, a desktop computer, a handheld computer, a mobile phone, a printed circuit board, a light assembly, a light-emitting diode (LED) system, and so forth.

Figure 1:
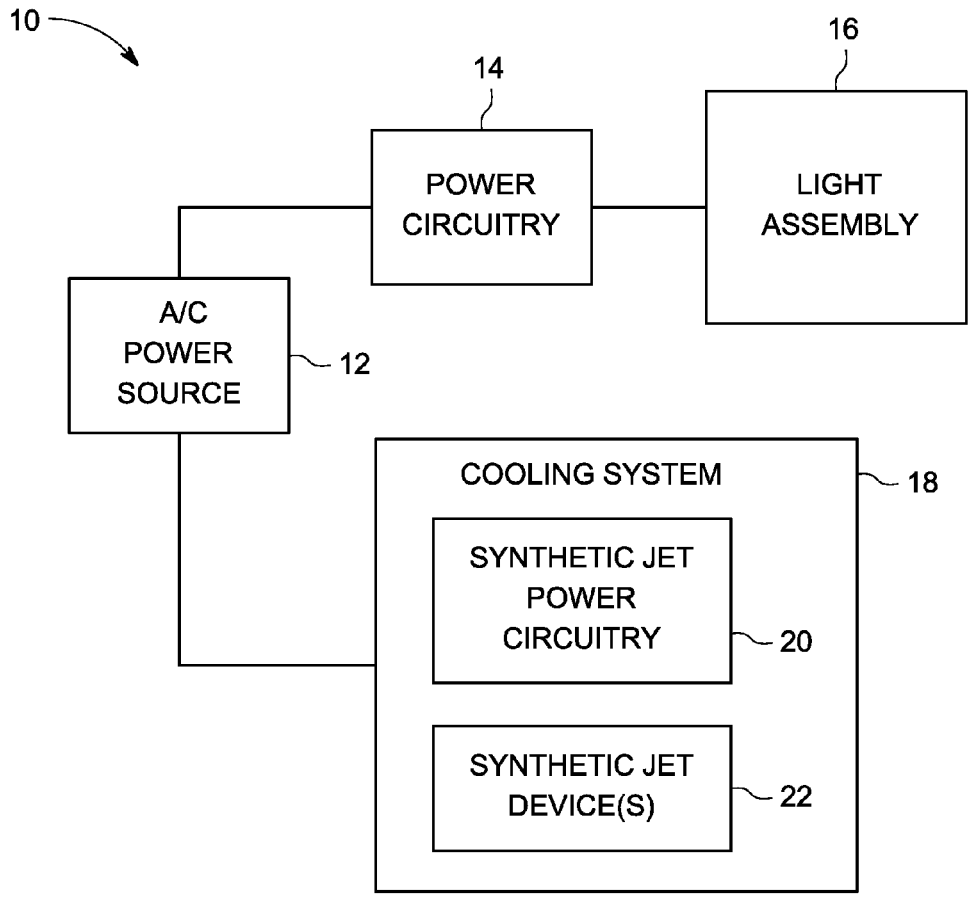
FIG. 1 is block diagram of an embodiment of a lighting system having a cooling system, in accordance with aspects of the present disclosure.

Referring now to FIG. 1, a block diagram of an embodiment of a lighting system 10 having a cooling system in accordance with aspects of the present disclosure is illustrated. The lighting system 10 is powered by an AC power source 12, such as an electrical outlet or generator. The AC power source 12 may provide any suitable voltage. For example, the AC power source 12 may provide 120 VAC, 230 VAC, or any other suitable AC voltage. The lighting system 10 includes power circuitry 14 for driving (e.g., powering) a light assembly 16. In accordance with one embodiment, the power circuitry 14 may include a number of electronic devices, microchips, and/or integrated circuits residing on a system board, such as a printed circuit board (PCB). Moreover, the light assembly 16 may include one or more light sources, an LED system, or any other suitable light emitting device. In one embodiment, the light assembly 16 may be capable of producing at least approximately 1500 lumens, while in other embodiments the light assembly 16 may produce fewer or greater lumens.

The lighting system 10 includes a cooling system 18 to cool the light assembly 16 and/or to cool the power circuitry 14. For example, the cooling system 18 may be configured to cool the light assembly 16 and/or to cool the power circuitry 14 such that temperatures of the light assembly 16 and/or the power circuitry 14 remain at less than 100° C. under normal operating conditions. In certain embodiments, the cooling system 18 may be disposed adjacent to the light assembly 16 and/or the power circuitry 14 and configured to direct air toward the light assembly 16 and/or the power circuitry 14 to facilitate cooling. As illustrated, the cooling system 18 includes synthetic jet power circuitry 20 and at least one synthetic jet device 22. The synthetic jet power circuitry 20 is used to facilitate conditioning of power provided to the synthetic jet device 22. In certain embodiments, as described herein, the synthetic jet power circuitry 20 may include only a single capacitor. Furthermore, in other embodiments, the synthetic jet power circuitry 20 may include a fuse, a shunt network (e.g., for tuning or detuning harmonics as applicable), and/or a transient voltage suppressor (TVS) in addition to a capacitor. Accordingly, the synthetic jet power circuitry 20 includes very few devices, thereby facilitating low operating power and low cost production of the cooling system 18.

Figure 2:
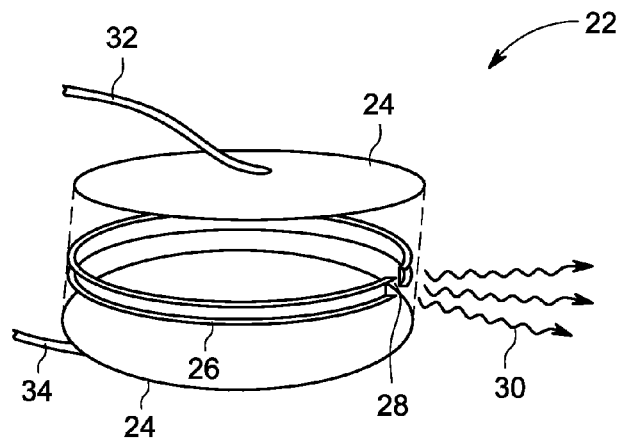
FIG. 2 is an exploded view of an embodiment of a synthetic jet device that may be used with the cooling system of FIG. 1, in accordance with aspects of the present disclosure.

FIG. 2 is an exploded view of an embodiment of the synthetic jet device 22 that may be used with the cooling system 18 of FIG. 1. The synthetic jet device 22 includes plates 24, a flexible wall 26, and an orifice 28. The plates 24 are separated from one another by the flexible wall 26. The flexible wall 26 includes the orifice 28 on the perimeter of the wall. The plates 24 are placed on either sides of the flexible wall 26 to define a fluid housing. To direct the volume of the fluid housing to increase and/or decrease, at least one of the plates 24 may be displaced. As may be appreciated, by decreasing the volume of the fluid housing, fluid 30 may be directed out of the fluid housing. In certain embodiments, the plates 24 are made from piezoelectric material or piezoelectric material bonded to a rigid disc, thereby enabling the plates 24 to be displaced when electric signals are provided thereto. In certain other embodiments, the plates 24 may be formed from materials including plastic, metal, glass or any other suitable materials. In such embodiments, the plates 24 may be coupled to linear actuators to enable displacement. Examples of linear actuators include, but are not limited to, piezoelectric actuators, electric actuators, ultrasonic actuators, electro-restrictive actuators, pneumatic actuators, and magnetic actuators. The piezoelectric actuators may be monomorph devices or bimorph devices.

The synthetic jet device 22 includes a first synthetic jet lead 32 and a second synthetic jet lead 34. To actuate the plates 24 made from piezoelectric material, a power source (e.g., the AC power source 12) is coupled to the plates 24 using the first and second synthetic jet leads 32 and 34. The power source is configured to provide alternating or direct current to the plates 24. The flexible wall 26 may be formed from a metal, plastic, glass, ceramic, elastomeric material, or any suitable material. Suitable metals include materials such as nickel, aluminum, copper and molybdenum, or alloys such as stainless steel, brass, bronze and the like. Suitable elastomeric material includes silicones, rubbers, urethanes, and the like. The plates 24 and the wall 26 may be adhered to each other with the help of suitable adhesives, or solders, or other fixing mechanisms.

In embodiments in which actuation signals are provided to the actuators on the plates 24, the plates 24 expand directing the volume in the housing to increase. With an increase in the volume of the housing, fluid enters the fluid housing through the orifice 28. In embodiments in which piezoelectric material is bonded to a rigid disc, the expansion of the piezoelectric material directs the rigid disc to deform into a dome shape thereby directing the volume of the housing to increase. In embodiments in which the power source provides DC electric signals, the plates 24 return to their original positions when the electric signals are disconnected leading to a reduction in volume of the fluid housing. In certain embodiments, when alternating electric signals are provided by the power source, the plates 24 are displaced in an opposite direction thereby causing a further reduction in volume of the fluid housing. When the volume in the fluid housing is reduced, a jet of fluid 30 escapes the orifice 28.

The synthetic jet device 22 is positioned such that the jet of fluid 30 escaping from the orifice 28 is directed toward heat generating elements (e.g., power circuitry 14, light assembly 16, etc.). Through convection, the jet of fluid 30 facilitates a reduction of the temperature of the heat generating elements. The process of applying electric signals to the actuators on the plates 24 may be repeated periodically to reduce the temperature of the heat generating elements. In certain embodiments, control systems may be used to control the application of electric signals to the plates 24. In some embodiments, to reduce the temperature of multiple heat generating elements, multiple synthetic jet devices 22 may be placed in a housing that holds the heat generating elements.

Figure 3:
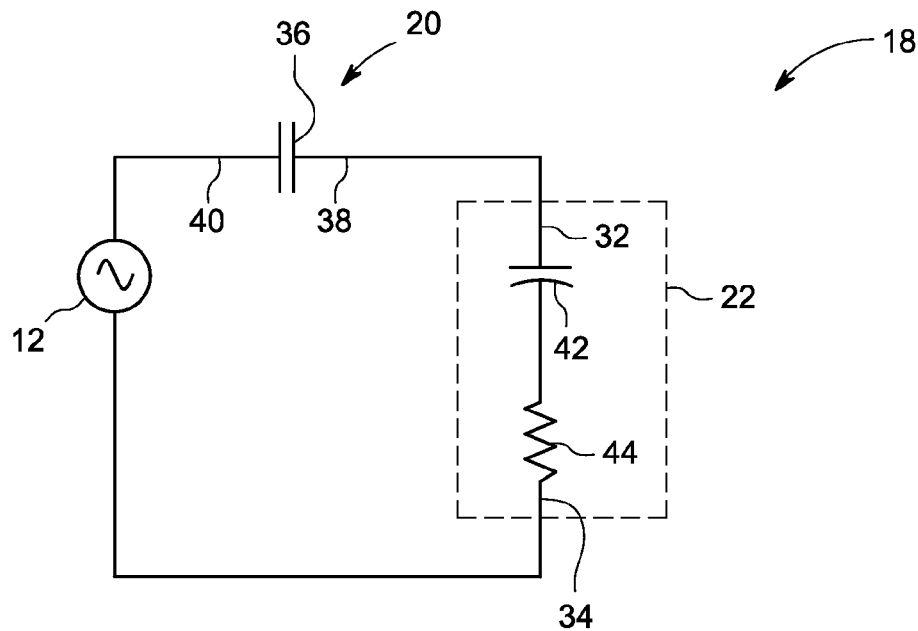
FIG. 3 is a schematic diagram of an embodiment of synthetic jet power circuitry for powering a synthetic jet device of the cooling system of FIG. 1, in accordance with aspects of the present disclosure.

FIG. 3 is a schematic diagram of an embodiment of the synthetic jet power circuitry 20 for powering the synthetic jet device 22 of the cooling system 18 of FIG. 1. As illustrated, the synthetic jet power circuitry 20 only includes a capacitor ($C_{BLOCK}$) 36 coupled in series with the synthetic jet device 22 and the AC power source 12. Specifically, a first capacitor lead 38 of the capacitor 36 is directly coupled to the first synthetic jet lead 32 of the synthetic jet device 22. Moreover, a second capacitor lead 38 of the capacitor 36 is directly coupled to the AC power source 12, and the second synthetic jet lead 32 of the synthetic jet device 22 is directly coupled to the AC power source 12. As may be appreciated, the capacitor 36 may be any suitable type of capacitor, such as a ceramic capacitor, a film capacitor, a power film capacitor, an electrolytic capacitor, a supercapacitor, and so forth. Furthermore, in certain embodiments, the capacitor 36 may be adjustable (e.g., tunable) to change its capacitance. Such tunable capacitors may be integrated with feedback loops that adjust the capacitance as a function of a measured parameter such as a voltage or a current.

As illustrated, the synthetic jet device 22 may include capacitive and resistive characteristics. Such capacitive and resistive characteristics of the synthetic jet device 22 are represented by a capacitor ($C_{JET}$) 42 and a resistor ($R_{JET}$) 44. The representative resistor 44 of the synthetic jet device 22 generally does not have much voltage drop across it because of the synthetic jet device 22 operating at low currents. Therefore, a peak-to-peak voltage ($V_{AC}$) provided by the AC power source 12 is substantially divided between the capacitor 42 of the synthetic jet device 22 and the capacitor 36 of the synthetic jet power circuitry 20. Thus, the capacitor 36 of the synthetic jet power circuitry 20 may be appropriately sized to facilitate a desired voltage ($V_{JET}$) across the capacitor 42 of the synthetic jet device 22. The voltage applied across the synthetic jet device 22 may be approximated as:

$$V_{JET} = \frac{C_{BLOCK}}{C_{JET} + C_{BLOCK}} V_{AC}$$

As may be appreciated, the capacitor 36 of the synthetic jet power circuitry 20 is used to reduce the voltage across the capacitor 42 of the synthetic jet device 22. Accordingly, in systems in which the AC power source 12 provides a suitable voltage for operating the synthetic jet device 22, the capacitor 36 of the synthetic jet power circuitry 20 may not be used. In certain embodiments, a suitable voltage for operating the synthetic jet device 22 may be between approximately 20 to 50 peak volts from the AC power source 12. In such embodiments, the capacitor 36 of the synthetic jet power circuitry 20 may be sized to have a capacitance of approximately 10 to 100 nF. For example, in certain embodiments, the capacitor 36 of the synthetic jet power circuitry 20 may have a capacitance of approximately 22 nF or 39 nF. As described herein, the synthetic jet power circuitry 20 includes only the capacitor 36. Therefore, the synthetic jet device 22 may be powered with little cost and using components that consume small amounts of power.

Figure 4:
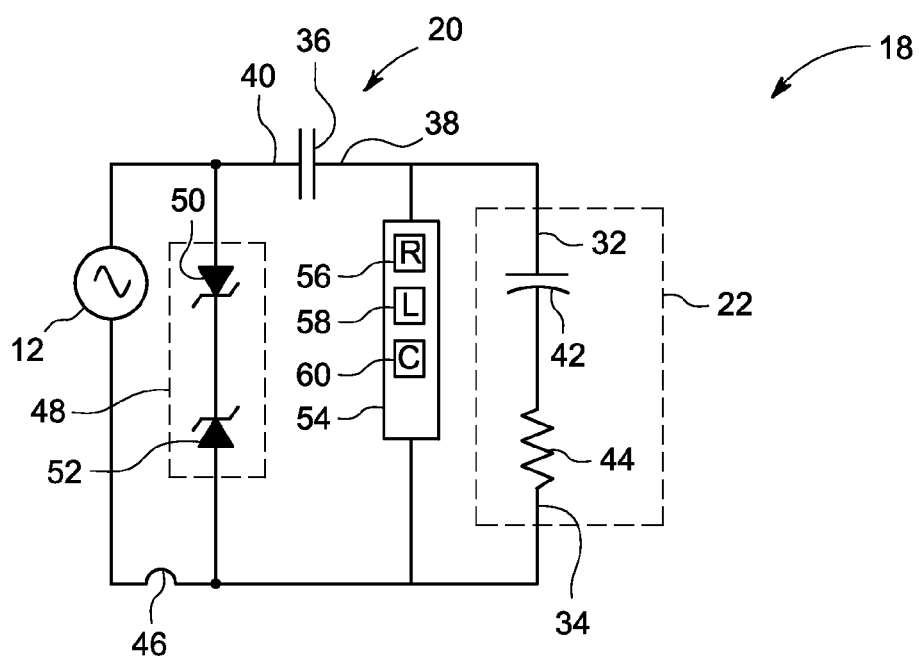
FIG. 4 is a schematic diagram of another embodiment of synthetic jet power circuitry for powering a synthetic jet device of the cooling system of FIG. 1, in accordance with aspects of the present disclosure.

FIG. 4 is a schematic diagram of another embodiment of the synthetic jet power circuitry 20 for powering the synthetic jet device 22 of the cooling system 18 of FIG. 1. The illustrated embodiment includes the capacitor 36 in series with the synthetic jet device 22. The synthetic jet power circuitry 20 also includes a fuse 46 in series with the AC power source 12, the capacitor 36, and the synthetic jet device 22. The fuse 46 may be used as over current protection for various components of the cooling system 18.

The synthetic jet power circuitry 20 includes a transient voltage suppressor (TVS) 48 coupled across the AC power source 12 and positioned in parallel with the capacitor 36 and the synthetic jet device 22. The TVS 48 may include one or more diodes (e.g., Zener diodes, avalanche diodes, etc.), metal-oxide varistors, and/or gas discharge tubes configured to react to sudden and/or momentary overvoltage conditions, thereby protecting other components of the cooling system 18. In the illustrated embodiment, the TVS 48 includes two Zener diodes 50 and 52.

The synthetic jet power circuitry 20 also includes a shunt network 54 parallel to the synthetic jet device 22 and configured to filter out higher order frequencies (e.g., harmonics) that may be present in the AC waveform from the AC power source 12. Specifically, the shunt network 54 includes passive elements such as a resistive element (R) 56, an inductive element (L) 58, and/or a capacitive element (C) 60 to filter out the higher order frequencies while minimizing impact on the fundamental AC waveform from the AC power source 12. As described herein, the synthetic jet power circuitry 20 may include various circuit protection and/or filtering elements that may be implemented with few components and low cost.

Figure 5:
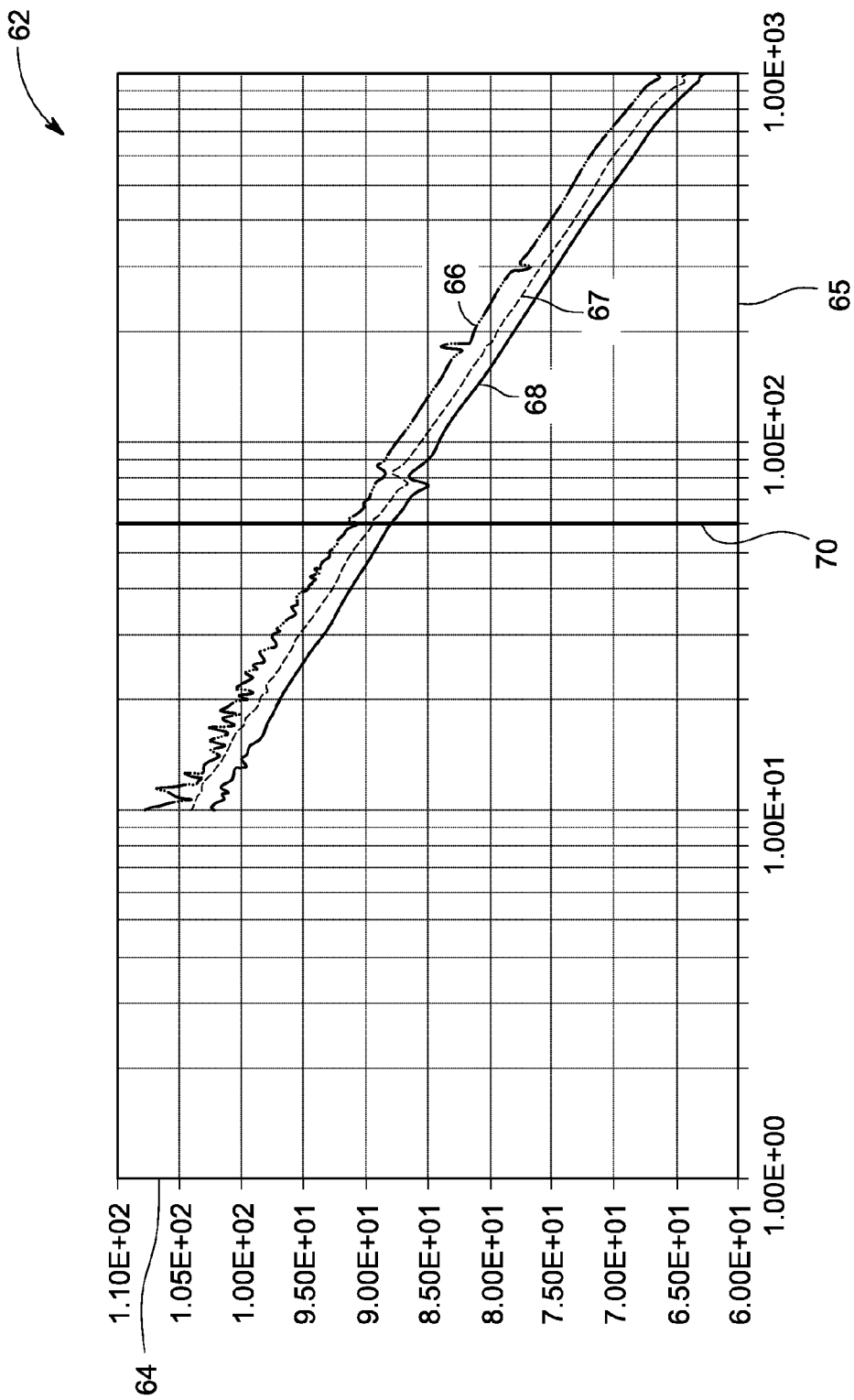
FIG. 5 is a chart of an embodiment of a frequency response of a synthetic jet device at different operating voltages, in accordance with aspects of the present disclosure.

FIG. 5 is a chart 62 of an embodiment of a frequency response of the synthetic jet device 22 at different operating voltages. Specifically, the chart 62 illustrates an impedance 64 of the synthetic jet device 22 relative to a frequency 65 applied to the synthetic jet device 22. In a first curve 66, a voltage of approximately 1.6 V is applied to the synthetic jet device 22. Furthermore, in a second curve 67, a voltage of approximately 10.0 V is applied to the synthetic jet device 22. Moreover, in a third curve 68, a voltage of approximately 15.0 V is applied to the synthetic device 22. Each of the first, second, and third curves 66, 67, and 68 have a substantially similar slope. As illustrated, a line 70 intersects the first, second, and third curves 66, 67, and 68 at a frequency of approximately 60 Hz. Furthermore, the chart 62 illustrates the capacitive nature of the synthetic jet device 22, showing that a capacitance has the impedance 64 that is inversely proportional to the frequency 65 applied thereto. Accordingly, there is a linear relationship between the impedance 64 of the synthetic jet device 22 and the frequency 65 applied to the synthetic jet device 22 when shown logarithmically. Therefore, the synthetic jet device 22 may mimic a capacitor in synthesizing a drive signal, as described above.

Figure 6:
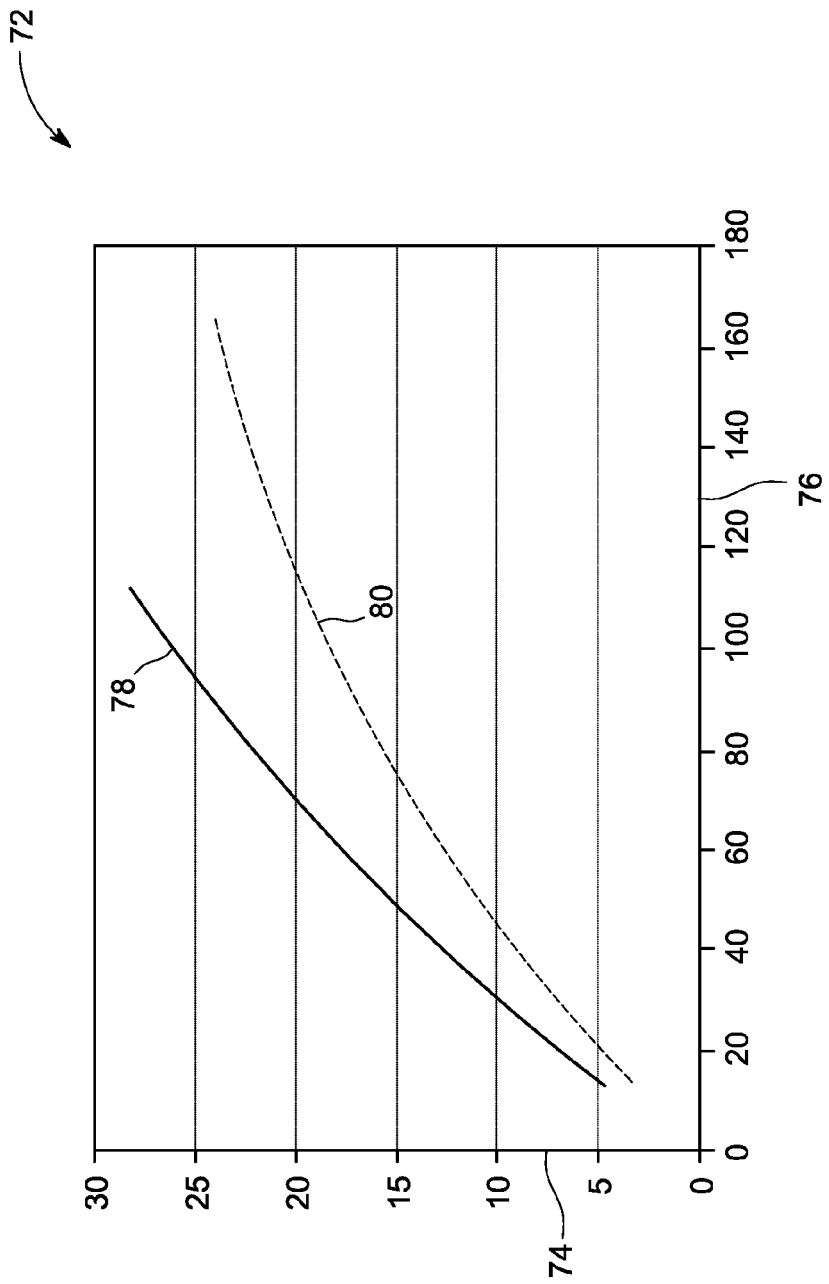
FIG. 6 is a chart of an embodiment of a voltage across a synthetic jet device with different sizes of blocking capacitors, in accordance with aspects of the present disclosure.

FIG. 6 is a chart 72 of an embodiment of a voltage across the synthetic jet device 22 with different sizes of blocking capacitors. Specifically, the chart 72 illustrates a peak AC voltage 74 of the synthetic jet device 22 relative to a peak AC voltage input 76 applied by the AC power source 12 with different sizes of blocking capacitors (e.g., capacitor 36). In a first curve 78, the capacitor 36 has a capacitance of approximately 39 nF. Furthermore, in a second curve 80, the capacitor 36 has a capacitance of approximately 22 nF. As illustrated, depending on the capacitance of the capacitor 36, the peak AC voltage 74 applied to the synthetic jet device 22 may be adjusted based on the peak AC voltage input 76. For example, using the second curve 80, if the peak AC voltage input 76 is approximately 120 VAC, the peak AC voltage 74 of the synthetic jet device 22 is approximately 22 VAC. As may be appreciated, the flow of air from the synthetic jet device 22 may be dependent on the applied voltage and/or frequency. Accordingly, the flow of air from the synthetic jet device 22 may be tuned by adjusting the applied voltage and/or frequency.

Technical effects of the invention include powering the synthetic jet device 22 using few, if any, components in addition to the synthetic jet device 22. For example, in some embodiments, the synthetic jet device 22 may be powered directly from an AC power source. In other embodiments, only one passive component (e.g., a capacitor) may be coupled in series with the synthetic jet device 22 and the AC power source for powering the synthetic jet device 22. Moreover, no active components may be used for powering the synthetic jet device 22. Therefore, the synthetic jet device 22 may be powered using circuitry having few components, low cost, and/or low power consumption.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A cooling system comprising:
   a synthetic jet having a first synthetic jet lead and a second synthetic jet lead; and
   a tunable capacitor having a first capacitor lead and a second capacitor lead, wherein the first capacitor lead is directly coupled to the first synthetic jet lead, and the synthetic jet is configured to be directly powered via an alternating current (AC) power source coupled directly to the second capacitor lead and to the second synthetic jet lead, wherein the tunable capacitor is tuned to adjust an input voltage applied to the synthetic jet.

2. The cooling system of claim 1, comprising a transient voltage suppressor (TVS) configured to be coupled to the AC power source in parallel with the synthetic jet and the capacitor.

3. The cooling system of claim 2, wherein the TVS comprises a plurality of Zener diodes.

4. The cooling system of claim 1, comprising a shunt network coupled to the first and second synthetic jet leads and configured to filter power from the AC power source.

5. The cooling system of claim 4, wherein the shunt network comprises a resistive element, a capacitive element, an inductive element, or some combination thereof.

6. The cooling system of claim 1, wherein a size of the capacitor is such that the synthetic jet receives a peak voltage of approximately 20 to 50 volts from the AC power source.

7. The cooling system of claim 1, wherein a capacitance of the capacitor is approximately 10 to 100 nF.

8. The cooling system of claim 1, wherein the capacitor and the synthetic jet are coupled together serially and are configured to be coupled serially with the AC power source.

9. The cooling system of claim 1, comprising a fuse coupled serially with the capacitor and the synthetic jet.

10. The cooling system of claim 1, wherein the capacitor comprises a film capacitor.

11. The cooling system of claim 1, wherein the cooling system is part of an AC powered light assembly, an AC adapter, a light-emitting diode (LED) system, a power supply, or some combination thereof.

12. The cooling system of claim 1, wherein the synthetic jet comprises a piezoelectric jet.

13. A lighting system comprising:
   a light assembly;
   a cooling system disposed adjacent to the light assembly and configured to direct air toward the light assembly to cool the light assembly, wherein the cooling system comprises:
      a synthetic jet having a first synthetic jet lead and a second synthetic jet lead; and
      a tunable capacitor having a first capacitor lead and a second capacitor lead, wherein the first capacitor lead is directly coupled to the first synthetic jet lead, and the synthetic jet is configured to be directly powered via an alternating current (AC) power source coupled directly to the second capacitor lead and to the second synthetic jet lead, wherein the tunable capacitor is tuned to adjust an input voltage applied to the synthetic jet.

14. The lighting system of claim 13, wherein the light assembly comprises a light-emitting diode (LED) light assembly.

15. The lighting system of claim 13, comprising power circuitry configured to power the light assembly using power from the AC power source, wherein the cooling system is disposed adjacent to the power circuitry and configured to direct air toward the power circuitry to cool the power circuitry.

16. The lighting system of claim 13, wherein the cooling system comprises a shunt network coupled to the first and second synthetic jet leads and configured to filter power from the AC power source.

17. The lighting system of claim 13, wherein the cooling system comprises a transient voltage suppressor (TVS) configured to be coupled to the AC power source in parallel with the synthetic jet and the capacitor.

18. A cooling system comprising:
   a piezoelectric synthetic jet; and
   synthetic jet power circuitry configured to condition power from an alternating current (AC) power source, and to provide the conditioned power directly to the piezoelectric synthetic jet, wherein the synthetic jet power circuitry consists essentially of a tunable capacitor tuned to adjust an input voltage applied to the piezoelectric synthetic jet.

19. The cooling system of claim 18, wherein the piezoelectric synthetic jet comprises a first synthetic jet lead and a second synthetic jet lead, the capacitor comprises a first capacitor lead and a second capacitor lead, the first capacitor lead is directly coupled to the first synthetic jet lead, and the AC power source is directly coupled to the second capacitor lead and to the second synthetic jet lead.

20. The cooling system of claim 18, wherein the capacitor comprises a variable capacitor, and a capacitance of the variable capacitor is configured to vary as a function of a feedback.

* * * * *